United States Patent
Shin et al.

(10) Patent No.: US 7,083,833 B2
(45) Date of Patent: *Aug. 1, 2006

(54) PHOTOALIGNMENT MATERIALS AND LIQUID CRYSTAL DISPLAY FABRICATED WITH SUCH PHOTOALIGNMENT MATERIALS

(75) Inventors: Hyun Ho Shin, Kunpo-shi (KR); Mi Sook Nam, Kunpo-shi (KR); Su Hyun Park, Anyang-shi (KR); Moonhor Ree, Pohang-shi (KR); Seung Woo Lee, Taegu-shi (KR)

(73) Assignees: LG.Philips LCD Co., Ltd., Seoul (KR); Pohang University of Science and Technology, Kyongsangbuk-do (KR)

( * ) Notice: Subject to any disclaimer, the term of this patent is extended or adjusted under 35 U.S.C. 154(b) by 111 days.

This patent is subject to a terminal disclaimer.

(21) Appl. No.: 10/859,133

(22) Filed: Jun. 3, 2004

(65) Prior Publication Data

US 2004/0219307 A1    Nov. 4, 2004

Related U.S. Application Data

(63) Continuation of application No. 09/946,625, filed on Sep. 6, 2001, now Pat. No. 6,793,987.

(30) Foreign Application Priority Data

Oct. 28, 2000   (KR) .............................. 2000-63686

(51) Int. Cl.
*G02F 1/1337*   (2006.01)
*C08G 73/10*    (2006.01)
*C09K 19/00*    (2006.01)

(52) U.S. Cl. .................. 428/1.1; 428/1.2; 428/1.26; 428/1.23; 428/1.25; 428/473.5; 428/474.4; 528/170; 528/310; 528/353

(58) Field of Classification Search ................ 428/1.1, 428/1.26, 1.23, 1.25, 1.2, 474.4, 473.5; 528/170, 528/310, 322, 353
See application file for complete search history.

(56) References Cited

U.S. PATENT DOCUMENTS

| | | | |
|---|---|---|---|
| 3,030,208 A * | 4/1962 | Schellenberg et al. ........ 96/35 |
| 3,912,920 A | 10/1975 | Kubota | |
| 4,861,854 A * | 8/1989 | Sugio et al. ................ 528/125 |
| 4,963,448 A | 10/1990 | Ichimura et al. | |
| 4,974,941 A | 12/1990 | Gibbons et al. | |
| 5,032,009 A | 7/1991 | Gibbons et al. | |
| 5,073,294 A | 12/1991 | Shannon et al. | |
| 5,296,321 A | 3/1994 | Kawanishi et al. | |
| 5,350,539 A * | 9/1994 | Mishina et al. ........ 252/299.4 |
| 5,389,698 A | 2/1995 | Chigrinov et al. | |
| 5,447,662 A | 9/1995 | Herr et al. | |
| 5,453,862 A | 9/1995 | Toko et al. | |
| 5,464,668 A * | 11/1995 | Asaoka et al. ............. 428/1.25 |
| 5,464,669 A | 11/1995 | Kang et al. | |
| 5,479,282 A | 12/1995 | Toko et al. | |
| 5,538,823 A | 7/1996 | Park et al. | |
| 5,539,074 A | 7/1996 | Herr et al. | |
| 5,576,862 A | 11/1996 | Sugiyama et al. | |
| 5,578,351 A | 11/1996 | Shashidhar et al. | |
| 5,602,661 A | 2/1997 | Schadt et al. | |
| 5,604,615 A | 2/1997 | Iwagoe et al. | |
| 5,657,105 A | 8/1997 | McCartney | |
| 5,712,696 A | 1/1998 | Toko et al. | |
| 5,744,203 A * | 4/1998 | Harada et al. ............. 428/1.23 |
| 5,764,326 A | 6/1998 | Hasegawa et al. | |
| 5,767,994 A | 6/1998 | Kang et al. | |
| 5,784,139 A | 7/1998 | Chigrinov et al. | |
| 5,786,041 A | 7/1998 | Takenaka et al. | |
| 5,824,377 A | 10/1998 | Pirwitz et al. | |
| 5,853,818 A | 12/1998 | Kwon et al. | |
| 5,856,430 A | 1/1999 | Gibbons et al. | |
| 5,856,431 A | 1/1999 | Gibbons et al. | |
| 5,859,682 A | 1/1999 | Kim et al. | |
| 5,880,803 A | 3/1999 | Tamai et al. | |
| 5,882,238 A | 3/1999 | Kim et al. | |
| 5,889,571 A | 3/1999 | Kim et al. | |
| 5,909,265 A | 6/1999 | Kim et al. | |
| 5,982,466 A | 11/1999 | Choi et al. | |
| 6,084,057 A * | 7/2000 | Gibbons et al. ............. 528/353 |
| 6,139,926 A * | 10/2000 | Auman et al. ............. 428/1.26 |
| 6,340,506 B1 * | 1/2002 | Buchecker et al. ........ 428/1.26 |

(Continued)

FOREIGN PATENT DOCUMENTS

DE    44 20 585    12/1995

(Continued)

OTHER PUBLICATIONS

WTEC Hyper-Librarian, Active Matrix LCDs, Dec. 1994.*

(Continued)

*Primary Examiner*—P. Hampton Hightower
(74) *Attorney, Agent, or Firm*—McKenna Long & Aldridge LLP

(57) ABSTRACT

An aromatic polyamide photoalignment material prepared by a reaction from a diamine compound with a side branch and a photosensitive dicarboxylic acid. Furthermore, liquid crystal display devices using such photoalignment materials in an alignment film on at least one substrate. The photoalignment material has a chemical structure as follows:

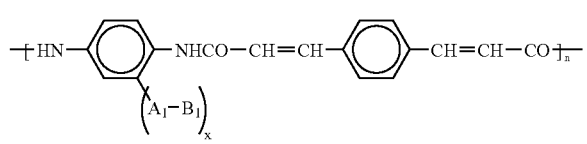

2 Claims, 1 Drawing Sheet

U.S. PATENT DOCUMENTS

| | | | |
|---|---|---|---|
| 6,770,335 B1 * | 8/2004 | Shin et al. | 428/1.25 |
| 6,793,987 B1 * | 9/2004 | Shin et al. | 428/1.25 |

FOREIGN PATENT DOCUMENTS

| | | |
|---|---|---|
| DE | 197 03 682 A1 | 8/1997 |
| EP | 0 261 712 A1 | 3/1988 |
| EP | 0 525 473 A2 | 2/1993 |
| EP | 0 525 478 A2 | 2/1993 |
| EP | 0 549 283 A2 | 6/1993 |
| EP | 0 611 786 A1 | 8/1994 |
| EP | 0 635 748 A1 | 1/1995 |
| EP | 0 690 334 A2 | 1/1996 |
| EP | 0 708 354 A1 | 4/1996 |
| EP | 0 742 471 A2 | 11/1996 |
| EP | 0 750 212 A2 | 12/1996 |
| EP | 0 788 012 A2 | 8/1997 |
| EP | 0 742 471 A3 | 10/1997 |
| EP | 0905168 A1 * | 3/1999 |
| GB | 2 309 793 | 8/1997 |
| GB | 2 309 794 | 8/1997 |
| GB | 2 317 964 A | 4/1998 |
| GB | 2 319 093 | 5/1998 |
| JP | 01-251344 | 10/1989 |
| JP | 01-251345 | 10/1989 |
| JP | 02-055330 A | 2/1990 |
| JP | 02-298917 | 12/1990 |
| JP | 04-007520 | 1/1991 |
| JP | 03-036527 | 2/1991 |
| JP | 03-120503 | 5/1991 |
| JP | 03-241311 | 10/1991 |
| JP | 04-284421 | 10/1992 |
| JP | 04-350822 | 12/1992 |
| JP | 05-019208 | 1/1993 |
| JP | 05-034699 | 2/1993 |
| JP | 05-053513 | 3/1993 |
| JP | 05-232473 | 9/1993 |
| JP | 07-056173 | 3/1995 |
| JP | 07-261185 | 10/1995 |
| JP | 07-318861 | 12/1995 |
| JP | 07-318942 | 12/1995 |
| JP | 08-012759 | 1/1996 |
| JP | 08-334790 | 12/1996 |
| JP | 09-211465 | 8/1997 |
| JP | 09-211468 | 8/1997 |
| JP | 09-265095 | 10/1997 |
| JP | 09-318946 A | 12/1997 |
| JP | 10-090684 | 4/1998 |
| JP | 10-154658 A | 6/1998 |
| JP | 10-161126 A | 6/1998 |
| JP | 10-332932 A | 12/1998 |
| JP | 11-194344 | 7/1999 |
| JP | 11-194345 | 7/1999 |
| WO | WO 94/28458 | 12/1994 |
| WO | WO 95/18989 | 7/1995 |
| WO | WO 95/22075 | 8/1995 |
| WO | WO 95/34843 | 12/1995 |
| WO | WO 99/08148 | 2/1999 |

OTHER PUBLICATIONS

J. L. West, et al., Polarized UV-Exposed Polyimide Films for Liquid-Crystal Alignment, *SID 95 Digest*, pp. 703-705.

J. Chen, et al., Investigation of the Mechanism of the Surface-Induced Alignment of Liquid Crystals by Linear Polymerized Photopolymers, *SID 95 Digest*, pp. 528-531.

A. Lien, et al., UV Modification of Surface Pretilt of Alignment Layers for Multidomain Liquid Crystal Displays, *Applied Physics Letters 67 (21)*, Nov. 20, 1995, pp. 3108-3110.

W. M. Gibbons, et al., Surface-Mediated Alignment of Nematic Liquid Crystals with Polarized Laser Light, *Nature*, May 2, 1991, pp. 49-50.

M. Schadt, et al., Surface-Induced Parallel Alignment of Liquid Crystals by Linearly Polymerized Photopolymers, *Jpn. J. Appl. Phys.*, vol. 31 (1992), Part 1, No. 7, Jul. 1992, pp. 2155-2164.

Y. Iimura, et al., Alignment Control of a Liquid Crystal on a Photosensitive Polyvinylalcohol Film, *Jpn. J. Appln. Phys.*, vol. 32 (1993), Part 2, No. 1A/B, Jan. 15, 1993, pp. sL93-L96.

J. Chen, et al., Model of Liquid Crystal Alignment by Exposure to Linearly Polarized Ultraviolet Light, *Physical Review E*, vol. 54, No. 2, Aug. 1996, pp. 1599-1603.

J. Chen, et al., P-54: Mechanism of Liquid-Crystal Alignment by Polyimide Exposure to Linearly Polarized UV Light, *SID 96 Digest*, pp. 634-637.

K.-W. Lee, et al., LP-K: Late-News Poster: Mechanism of UV Modification of LC Pretilt Angle and Its Application to Two-Domain TN-LCDs, *SID 96 Digest*, pp. 638-641.

J. H. Kim, et al., LP-L: Late-News Poster: Photo-Alignment of Liquid Crystals Using a New Photopolymer, *SID 96 Digest*, pp. 646-649.

Y. Saitoh, et al., P-58: Stability of UV-Type Two-Domain Wide-Viewing-Angle TFT-LCD Panels, *SID 96 Digest*, pp. 662-665.

T. Yamaoto, et al., P-55: Liquid-Crystal Alignment by Slantwise Irradiation of Non-Polarized US Sight on a Polyimide Layer, *SID 96 Digest*, pp. 642-645.

M. Schadt, et al., Optical Patterning of Multi-Domain Liquid-Crystal Displays with Wide Viewing Angles, *Nature*, vol. 381, May 16, 1996, pp. 212-215.

M. Schadt, et al., Photo-Generation of Linearly Polymerized Liquid Crystal Aligning Layers Comprising Novel, Integrated Optically Patterned Retarders and Color Filters, *Jpn. J. Appl. Phys.*, vol. 34 (1995), Part 1, No. 6A, Jun. 1995, pp. 3240-3249.

P. J. Shannon, et al., Patterned Optical Properties in Photopolymerized Surface-Aligned Liquid-Crystal Films, *Nature*, vol. 368, Apr. 7, 1994, pp. 532-533.

K. Ichimura, Photocontrol of Liquid Crystal Alignment, *Oyo Butuiri*, vol. 62, No. 10 (1993), pp. 998-1001 (in Japanese).

T. Marsuii, et al., Photosensitive Orientants for Liquid Crystal Alignment, *Mol. Mat.*, 1993, vol. 3, pp. 161-168.

M. Hasegawa, et al., Nematic Homogeneous Photo Alignment by Polyimide Exposure to Linearly Polarized UV, *Journal of Photopolymer Science and Technology*, vol. 8, No. 2 (1995), pp. 241-248.

T. Hashimoto, et al., 41.4: TN-LCD with Quartered Subpixels Using Polarized UV-Light-Irradiated Polymer Orientation Films, *SID 95 Digest*, pp. 877-880.

T. Saitoh, et al., S23-4 A New Hybrid N-TB Mode LCD with Two Domain Pixels Fabricated Using a Photopolymer, *Asia Display 95*, pp. 589-592.

H. S. Soh, et al., 19.1: The Realization of Wide Viewing Angle TFT-LCDs using Photo-Alignment Method, *Euro Display 96*, pp. 579-583.

D.-S. Seo, et al., 44.1: Invited Address: Surface Alignment of Liquid Crystals in LCDs, *SID 93 Digest*, pp. 953-956.

Y. Iimura, et al., 19.1: Invited Paper: Prospects of the Photo-Alignment Technique for LCD Fabrication, *SID 97 Digest*, pp. 311-314.

R. Shashidhar, et al., 19.2: A New Non-Rubbing Technique for Liquid-Crystal Alignment, *SID 97 Digest*, pp. 315-318.

M. Schadt, et al., 24.1: Invited Paper: Optical Patterning of Multidomain LCDs, *SID 97 Digest*, pp. 397-400.

K.Y. Han, et al., P-54: A Study on the Photo-Alignment of the Polymer-Containing Cinnamate Group Using a New Single UV-Exposure Method, *SID 97 Digest*, pp. 707-710.

F. Yamada, et al., LP-J: Late-News Poster: A New Photo-Alignment Scheme for LC-Cell Pretilt Control, *SID 97 Digest*, pp. 715-718.

A. Lien, et al., S23-5 UV-Type Two-Domain Wide Viewing Angle TFT/LCD Panels, *Asia Display 95*, pp. 593-596.

Lim et al., Tilting of Liquid Crystal through Interaction with Methyl Orange Molecules Oriented by Circularly Polarized Light, *JP Journal of Applied Physics*, vol. 35, No. 10 (1996), pp. 1281-1283.

Eugene Hecht, *Optics*, 1987, pp. 298-299.

Jenkins, et al., *Fundamentals of Optics*, McGraw-Hill Book Company, 3rd Edition, 1957, pp. 492-493.

M.S. Nam, et al., 38.2: Wide-Viewing-Angle TFT-LCD with Photo-Aligned Four-Domain TN Mode, *SID 97 Digest*, pp. 933-936.

A. Dyadyusha , V. et al., *Light Induced Planar Orientation of Nematic Liquid Crystal on Anisotropic Surface without Microrelief*, Ukrainski Fizicheski Shumal 36, 1991, pp. 1059-1062 (in Russian).

Y. Iimura, et al., 44.1: Invited Address: Electro-Optic Characteristics of Amorphous and Super-Multidomain TN-LCDs Prepared by a Non-Rubbing Method, *SID 94 Digest*, pp. 915-918.

\* cited by examiner

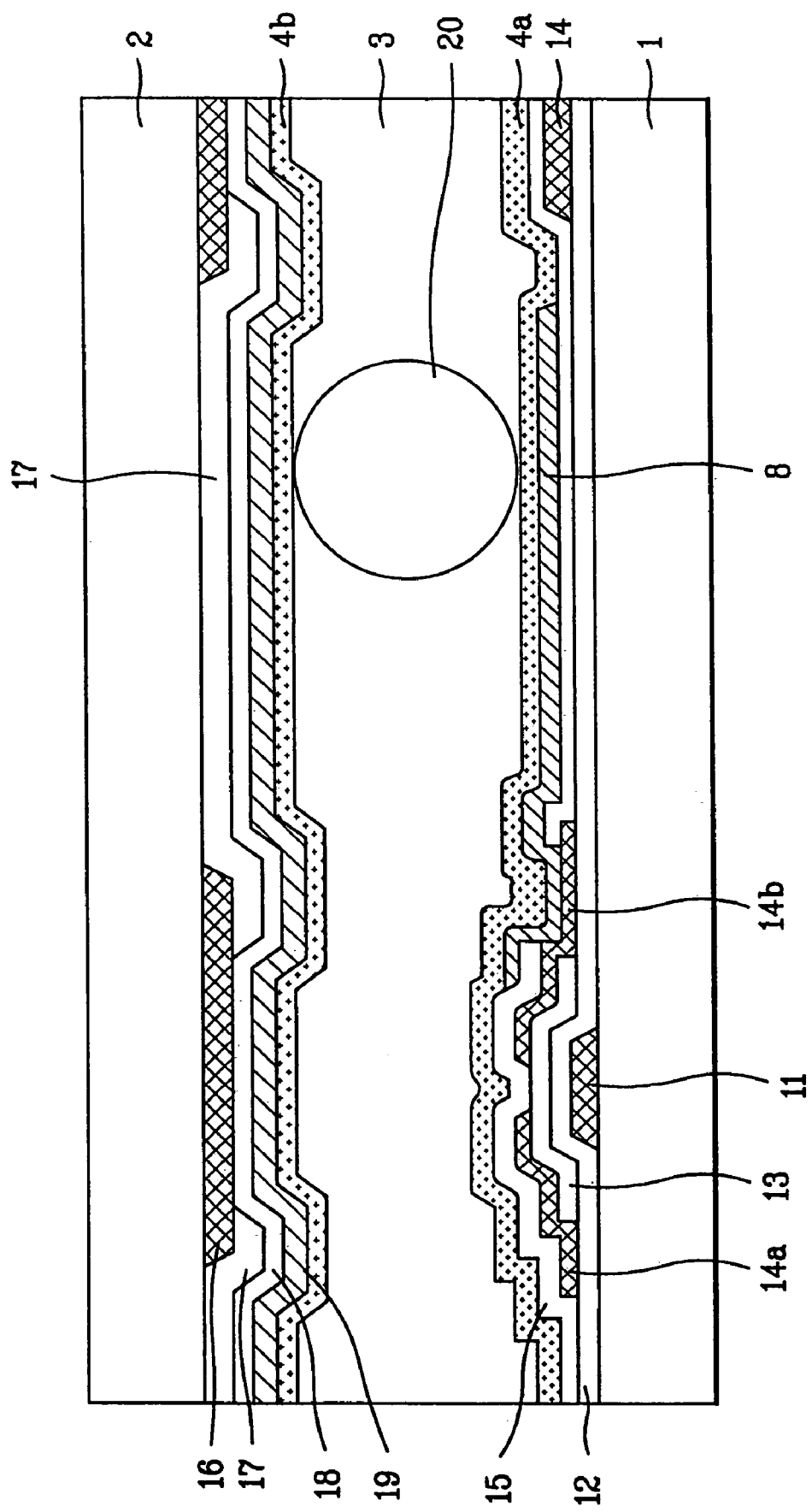

PHOTOALIGNMENT MATERIALS AND LIQUID CRYSTAL DISPLAY FABRICATED WITH SUCH PHOTOALIGNMENT MATERIALS

CROSS REFERENCES TO RELATED APPLICATIONS

This application is a continuation application of U.S. patent application Ser. No.: 09/946,625 filed Sep. 6, 2001, now U.S. Pat. No. 6,793,987; which claims priority to Korean Patent Application No.: 2000-63686, filed Oct. 28, 2000, each of which is incorporated by reference for all purposes as if fully set forth herein.

BACKGROUND OF THE INVENTION

1. Field of the Invention

The present invention relates to photoalignment materials and to their use in liquid crystal displays.

2. Description of the Related Art

Flat panel display devices, including liquid crystal display devices, are widely used in cellular phones, notebook computers, and wide screen televisions. Advantages of flat panel displays include low power consumption, lightweight, thinness, and portability.

A liquid crystal display device includes a liquid crystal panel. Such panels are formed by aligning two prepared substrates at a constant interval, and then injecting a liquid crystal between them. To serve as a display device, such liquid crystal display devices should meet the requirements of good light transmission, fast response time, wide viewing angle, and good contrast.

Because those requirements are dependent on the alignment characteristics of the liquid crystal molecules in the liquid crystal panel, it is important to properly align those molecules. However, proper alignment is not accomplished by simply injecting liquid crystal molecules between two substrates. An alignment film is generally required.

A polyimide resin is usually used for the alignment film. The chemical structure of polyimide can be divided into a main chain, which plays a major role for aligning liquid crystal molecules in one direction, and a side branch, which forms a pretilt angle.

To form a liquid crystal alignment film using polyimide, the polyimide is normally coated as a thin alignment film (with a thickness of 1 micrometer or less) and dried. Then, the surface of the thin film is physically rubbed with a specifically manufactured cloth. This process is typically used when manufacturing liquid crystal displays because it is simple and easy.

Unfortunately, rubbing is not appropriate for alignments over large areas. Furthermore, the many variables associated with the process are difficult to control. Also, an alignment film can be contaminated by fine particles or fibers produced by the rubbing process, and thin film transistors used in the display can be damaged by static electricity produced by rubbing. These problems can result in low quality or defective devices.

New methods to solve the foregoing problems are being developed. For example, photoalignment methods might enable simple and easy to align polymer surfaces without rubbing.

Known photoalignment materials include polyvinyl-cinnamates and polyvinylmethoxy-cinnamate. Those polymers produce photoalignment, but problems exist with long term alignment stability and thermal stability. Besides, those materials generally establish low pretilt angles. Thus it is difficult or impossible to obtain a desired pretilt angle for the liquid crystal alignment.

Thermal issues are significant since an alignment film's stability is dependent on the thermal stability of the polymer per se. In particular, photoalignment materials having a glass transition temperature below 100° C. are not appropriate for alignment layers since thermal stability around the glass transition temperature is poor.

Although many attempts have been made to solve the problems, a new photoalignment material that is sensitive to ultraviolet light would be beneficial.

SUMMARY OF THE INVENTION

It is an object of the present invention to provide a diamine derivative compound with a side branch.

Another object of the present invention is to provide a photoalignment polymer material that has excellent absorptivity of ultraviolet ray at 250–400 nm wavelengths by including a dicarboxilic acid derivative for a main chain, and that improves liquid crystal alignment and pretilt angle by including a diamine derivative compound having a side branch in a main chain.

Still another object of the present invention is to provide a liquid crystal display device that can improve the viewing angles of a liquid crystal display using an alignment film comprised of the above-described photoalignment material.

BRIEF DESCRIPTION OF THE DRAWINGS

The above objects, features and advantages of the present invention will become more apparent from the following detailed description when taken in conjunction with the accompanying drawing, FIG. 1, which presents a cross-sectional view of a liquid crystal display.

DETAILED DESCRIPTION OF THE PREFERRED EMBODIMENT

A preferred embodiment of the present invention will now be described with reference to the accompanying drawing. Well-known functions or constructions are not described in detail since they could obscure the invention.

The principles of the present invention provide for a diamine compound with a side branch, as illustrated in Chemical Formula 1 or Chemical Formula 2.

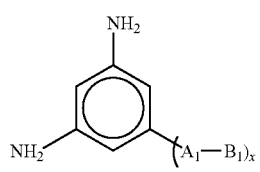

<Chemical Formula 1>

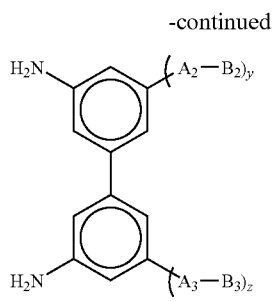

<Chemical Formula 2> where subscript x is an integral number from 0 to 4, component $A_1$ is selected from the group consisting of —$CH_2$—, —CH=, —O—, —COO—, —OOC—, —NHCO—, and —CONH—, respectively; and component $B_1$ is a functional group selected from the group consisting of hydrogen, halogen, cyano, nitro, amino, alkyl ($C_1$–$C_{100}$), haloalkyl, cyanoalkyl, nitroalkyl, hydroxyalkyl, cyanohaloalkyl, nitrohaloalkyl, cyanonitroalkyl, hydroxyhaloalkyl, cyanohydroxyalkyl, hydroxynitroalkyl, aryl ($C_6$–$C_{100}$), alkylaryl, haloaryl, haloalkylaryl, nitroaryl, nitroalkylaryl, cyanoaryl, cyanoalkylaryl, nitroaryl, nitroalkylaryl, hydroxyaryl, hydroxyalkylaryl, cyanohaloaryl, and cyanohaloalkylaryl.

Another aspect of the present invention provides a photoalignment material, aromatic polyamide, as illustrated in Chemical Formula 3 or Chemical Formula 4, respectively, where the aromatic polyamide includes the diamine compound of Chemical Formula 1 or Chemical Formula 2 in a main chain.

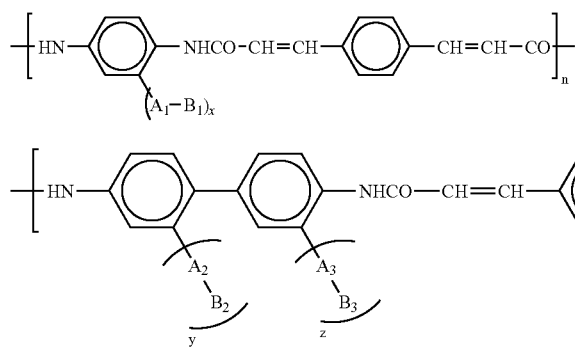

<Chemical Formula 3>

<Chemical Formula 4> where subscripts y and z are an integral number from 0 to 4, respectively; components $A_2$ and $A_3$ are selected from the group consisting of —$CH_2$—, —CH=, —O—, —COO—, —OOC—, —NHCO—, and —CONH—, respectively; and components $B_2$ and $B_3$ are a functional group selected from the group consisting of hydrogen, halogen, cyano, nitro, amino, alkyl ($C_1$–$C_{100}$), haloalkyl, cyanoalkyl, nitroalkyl, hydroxyalkyl, cyanohaloalkyl, nitrohaloalkyl, cyanonitroalkyl, hydroxyhaloalkyl, cyanohydroxyalkyl, hydroxynitroalkyl, aryl ($C_6$–$C_{100}$), alkylaryl, haloaryl, haloalkylaryl, nitroaryl, nitroalkylaryl, cyanoaryl, cyanoalkylaryl, nitroaryl, nitroalkylaryl, hydroxyaryl, hydroxyalkylaryl, cyanohaloaryl, and cyanohaloalkylaryl.

The molecular weight of the above exemplary compound of Chemical formulas 3 and 4 is in a range from 1,000 to 1,000,000, respectively.

The aromatic polyamide of Chemical Formula 3 or Chemical Formula 4 is prepared by polymerization of the diamine compound of Chemical Formula 1 and Chemical Formula 2, respectively, with an aromatic dicarboxylic acid derivative compound, which is illustrated in Chemical Formula 5.

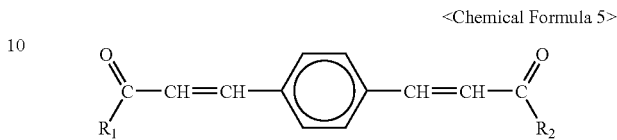

<Chemical Formula 5> where components $R_1$ and $R_2$ are functional groups selected from a group consisting of hydroxy, chloro, iodin, fluoro, and alkoxy.

Still another aspect of the present invention provides a liquid crystal display, comprising a first substrate, a second substrate, a liquid crystal layer between those substrates, and an alignment film on either the first substrate or on the second substrate, wherein the alignment film includes a photoalignment material illustrated in Chemical Formal 3 or Chemical Formula 4.

The first substrate is a TFT (Thin Film Transistor) substrate have TFTs as switching devices. The second substrate is a color filter substrate having a color filter layer for displaying colors. FIG. 1 is a cross-sectional view of such a liquid crystal display.

Referring to FIG. 1, the liquid crystal display includes a first substrate 1, a second substrate 2, a liquid crystal layer 3 between the first substrate 1 and the second substrate 2, and a spacer 20 between the first substrate 1 and the second substrate 2 that maintains a constant space between the two substrates.

The first substrate includes a gate line and a gate electrode 11, a gate insulating film 12 over the substrate and the gate electrode 11, a semiconductor layer 13 on a gate insulating film and over the gate electrode 11, a data line 14 that intersects the gate line, a source electrode 14a and a drain electrode 14b on the semiconductor layer 13, a first protective film 15 over the previously described structures, including the source and drain electrodes 14a and 14b, a pixel electrode 8 in a pixel regions and connected to the drain electrode 14b, and a first alignment film 4a over the entire surface, including the pixel electrode 8.

The second substrate comprises a black matrix 16 for reducing light leakage, a color filter layer 17, in openings of

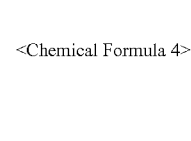

the black matrix 16, for displaying color, a second protective 25 film 18 over the previously described structures, including the color filter layer 17, a common electrode 19 on the second protective film 18, and a second alignment film 4b, over the common electrode 19.

At least, one of the alignment films (4a, 4b) is a photoalignment film employing a photoalignment material according to the principles of the present invention.

Another aspect of the present invention provides photosensitive diamine compounds have side-branches, as illustrated in Chemical Formula 6 or Chemical Formula 7. The present invention further provides for two embodiments: one the compound of Chemical Formula 6 included in the photoalignment polyamide represented by Chemical Formula 3, and the other the compound of Chemical Formula 7 included in the photoalignment polyamide represented by Chemical Formula 4.

<Chemical Formula 6>

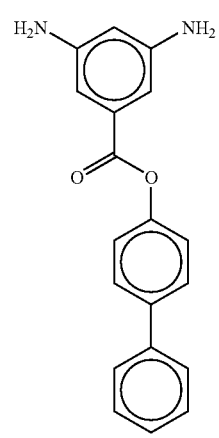

<Chemical Formula 7>

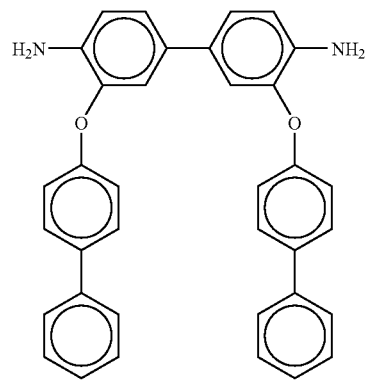

The diamine compound with a side branch illustrated in Chemical Formula 6 is prepared by a coupling reaction of 1,3-diamino benzoic acid and 4-phenyl phenol.

The diamine compound with a side branch illustrated in Chemical Formula 7 is prepared: protective the amino functional group in 2 moles of phthalic dianhydride by 1 mole of 3,3'-dihydroxy-4,4'-diamino-biphenyl (HAB); completely dissolving 2-equivalent 4-biphenylmethanol and a catalyst, triphenyl phospine in N-methylpyrrolidinone (NMP) under a nitrogen atmosphere; slowly adding another catalyst, di-isopropyl azodicarboxylate, and violently stirring the mixture for 8 hours at room temperature. Then, placing the resulting solution in methanol where the two solutions violently reacte, and removing the phthalic protective group from the product under a weak base solution.

To prepare a photoalignment polyamide, into a solvent of N-methylpyrrolidinone and pyridine at a mixing ratio of 4:1 by volume dissolve 1 mole of 1,4-phenylene diacrylic acid, and 1 mole of the above-described diaminine compound with a side branch under a nitrogen atmosphere. 2 moles of triphenylphosphite are then added to the solution, which is then stirred for 1 to 10 hours until the mixture is sufficiently aged. Then, the temperature is slowly raised to 50 to 100° C. and the reaction is continued for 1 to 10 more hours.

The resulting polymer solution from the above-described reaction is placed into methanol, where two solutions violently react to yield a solid polyamide.

A polyamide thin film can be prepared by dissolving the aforementioned solid polyamide in N-methylpyrrolidinone, and then spin coating the resulting solution on a glass substrate in the amount of 1 to 20% by weight, more preferably, 2 to 4% by weight, and then vacuum drying the substrate at 120° C. to form a thin polyamide film. Beneficially, the polyamide thin film has a thickness of 0.05 to 10 micrometers.

The above-described photoalignment thin film after being suitably irradiated (see below) is useful for controlling the liquid crystal molecule pretilt angle.

The photoalignment film can be fabricated on one substrate or both of them. If fabricated only on one substrate, the other substrate can include an conventionaly rubbed alignment layer.

To obtain a desired pretilt angle, a double irradiation method that sequentially uses non-polarized light and linearly polarized light can be used. When using the double irradiation method, a 45° angle between an ultraviolet ray progressing plate and the thin film is beneficially maintained. Light comprised of 0.25 J/cm$^2$ of non-polarized light and 1.5 J/cm$^2$ of linearly polarized light are then irradiated in that order.

Another light irradiation method that uses only a single irradiation can also be performed. The single irradiation method beneficially uses an inclined light, which can be a non-polarized UV light, a un-polarized light, a partially polarized light, or a linearly polarized light. The pretilt angle and the pretilt direction (alignment direction) can be determined by a single irradiation method at the same time.

When photoalignment is complete, sealing agents that form a seal and spacers can be located on the first substrate. Then, the second substrate can be attached to the first substrate. Beneficially, the separatoin between the two substrates is 1 to 100 micrometers, and more preferably, 2 to 20 micrometers. Then, a liquid crystal material can be injected between the first and the second substrates. The seal is then completely sealed.

The liquid crystal material can be a mixture of 4'-pentyl-4-bisphenylcarbonitril, the typical material having the nematic liquid crystal structure, and 1 wt. % of antiquinone pigment, disperse blue 1 ($\lambda_{max}$=607 nm), was used. Also, a positive or negative dielectric anisotropy liquid crystal is suggested. It is also possible to add a chiral dopant.

Alignment of liquid crystal molecules in a liquid crystal cell can be measured as a function of a rotation angle by using the absorptivity of linearly polarized He—Ne laser.

The present invention will now be described in more detail by referring to the following examples.

First Embodiment

To synthesize a diamine compound with a side branch, to 1,3-diamino benzoic acid add an amount of thiol chloride. That mixture is then reacted at 80° C. under a nitrogen atmosphere for five hours. 4-phenyl phenol is then added. Using tetrahydrofuran (THF) as a solvent and pyridine as a catalyst, the resulting mixture is reacted at room temperature under a nitrogen atmosphere for 24 hours. Then, the resulting solution is place in water, where the two liquids violently react. A solid diamine compound with side branches results.

To prepare a photoalignment polyamide thin film, into a solvent of N-methyl pyrrolidinone and pyridine with a mixing ratio of 4:1 by volume dissolve 1 mole of 1,4-phenylene diacrylic acid and 1 mole of the above-described diaminine compound with a side branch under a nitrogen atmosphere. 2 moles of triphenylphosphite are then added to the solution, which is then stirred for 1 to 5 hours until the mixture is sufficiently aged. Then, using a vacuum oven, the temperature is slowly raised to between 50 and 150° C. and the mixture is dried for 24 hours.

A liquid crystal cell can be manufactured using the dried mixture as a photoalignment polyamide thin film. The pretilt angles of such liquid crystal cells were measured in accordance with a crystal rotation method after the double irradiation method or the single irradiation method. The measured pretilt angle was approximately 4.2° after irradiated with 1.5 mJ/cm$^2$ of linearly polarized ultraviolet light using the single irradiation method. Using the double irradiation method with 0.25 mJ/cm$^2$ of non-polarized ultraviolet light and 1.5 mJ/cm$^2$ of linearly polarized ultraviolet light, the pretilt angle was approximately 6°.

Second Embodiment

To synthesize a second embodiment diamine compound with a side branch, to N-methylpyrrolidinone add 1 mole of 3,3'-dihydroxy-4,4'-diamino-biphenyl having a hydroxy functional group and 2 moles of phthalic dianhydride. Then, react that mixture at 150° C. to 220° C. for 1 to 3 days. The resulting compound having a well protected amine functional group is then place in methanol. A violent reaction yields a solid product.

The above-described solid and 2-equivalent 4-biphenyl-methanol are then completely dissolved in N-methylpyrrolidinone under a nitrogen atmosphere, using triphenylphosphite (TPP) as a catalyst. Another catalyst, di-isopropyl azodicarboxylate, is then slowly added and the mixture is vigorously stirred at a room temperature for 8 hours. The resulting polymer solution is then dropped into methanol. The two solutions violently react, producing a solid product. That solid product and hydrazine monohydrate are then dissolved in tetrahydrofuran (THF) and refluxed to yield a desired diamine compound with a side branch.

To prepare a photoalignment polyamide, into a solvent of N-methylpyrrolidinone and pyridine at a mixing ratio of 4:1 by volume dissolve 1 mole of 1,4-phenylene diacrylic acid and 1 mole of the above-described diaminine compound with a side branch under a nitrogen atmosphere. 2 moles of triphenylphosphite are then added to the solution, which is then stirred for 1 to 10 hours until the mixture is sufficiently aged. Then, the temperature is slowly raised to 50 to 150° C. and the reaction is allowed to continued for 1 to 10 more hours.

The resulting polymer solution is then placed in methanol, where the two solutions violently react, yielding a solid photoalignment polyamide. That solid photoalignment polyamide is then dissolved in N-methylpyrrolidinone to prepare 2 wt. % of polymer solution. That solution is then spin coated on a glass substrate and dried in a vacuum oven at 120° C. for 24 hours. A desired polyamide thin film results.

The polyamide thin film is then irradiated with UV light in accordance with the double irradiation method or the single irradiation method described above. The pretilt angles of such liquid crystal cells were measured in accordance with a crystal rotation method. The measured pretilt angle was approximately 0.4° after irradiated with 1.5 mJ/cm$^2$ of linearly polarized ultraviolet light using the single irradiation method. Using the double irradiation method with 0.25 mJ/cm$^2$ of non-polarized ultraviolet light and 1.5 mJ/cm$^2$ of linearly polarized ultraviolet light, the pretilt angle was approximately 0.8°.

The photoalignment film described above is beneficially applied to at least one substrate. The conventional rubbed alignment film can be applied to the other substrates.

The photoalignment film is useful with many liquid crystal modes, including TN (twisted nematic), STN (super twisted nematic), IPS (in-plane switching), OCB (optically controlled birefringence), VA (vertical alignment), FLC (ferroelectric liquid crystal), and PDLC (polymer dispersed liquid crystal display).

Therefore, the present invention provides for photoalignment materials and for liquid crystal display devices that use such materials. Photoalignment material according to the principles of the present invention shows excellent photosensitivity and photoalignment characteristics because they contains highly photosensitive dicarboxylic acid derivative compounds in a main chain. Those photoalignment materials can improve liquid crystal alignment and pretilt angle characteristics by employing a diamine component with side branches in a main branch. Liquid crystal display devices employing such photoalignment materials can have improved viewing angles.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A photoalignment material comprising a diamine compound with a side branch and in accord with chemical formula 1;

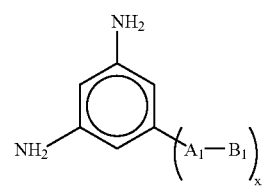

<Chemical Formula 1> where subscript x is an integral number from 0 to 4; component $A_1$ is selected from a group consisting of —$CH_2$—, —CH=, —O—, —COO—, —OOC—, —NHCO—, and —CONH—; and component $B_1$ is a functional group selected from a group consisting of hydrogen, halogen, cyano, nitro, amino, alkyl ($C_1$–$C_{100}$), haloalkyl, cyanoalkyl, nitroalkyl, hydroxyalkyl, cyanohaloalkyl, nitrohaloalkyl, cyanonitroalkyl, hydroxyhaloalkyl, cyanohydroxyalkyl, hydroxynitroalkyl, aryl ($C_6$–$C_{100}$), alkylaryl, haloaryl, haloalkylaryl, nitroaryl, nitroalkylaryl, cyanoaryl, cyanoalkylaryl, nitroaryl, nitroalkylaryl, hydroxyaryl, hydroxyalkylaryl, cyanohaloaryl, and cyanohaloalkylaryl.

2. A photoalignment material comprising a diamine compound with a side branch and in accord with Chemical Formula 2;

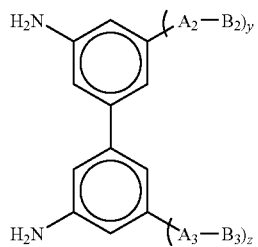

<Chemical Formula 2> where subscripts y and z are integral numbers from 0 to 4; components $A_2$ and $A_3$ are selected from a group consisting of —$CH_2$—, —CH=, —O—, —COO—, —OOC—, —NHCO—, and —CONH—; and components $B_2$ and $B_3$ are functional groups selected from a group consisting of hydrogen, halogen, cyano, nitro, amino, alkyl ($C_1$–$C_{100}$), haloalkyl, cyanoalkyl, nitroalkyl, hydroxyalkyl, cyanohaloalkyl, nitrohaloalkyl, cyanonitroalkyl, hydroxyhaloalkyl, cyanohydroxyalkyl, hydroxynitroalkyl, aryl ($C_6$–$C_{100}$), alkylaryl, haloaryl, haloalkylaryl, nitroaryl, nitroalkylaryl, cyanoaryl, cyanoalkylaryl, nitroaryl, nitroalkylaryl, hydroxyaryl, hydroxyalkylaryl, cyanohaloaryl, and cyanohaloalkylaryl.

* * * * *